(12) United States Patent
Hashimoto

(10) Patent No.: US 7,356,581 B2
(45) Date of Patent: Apr. 8, 2008

(54) STORAGE NETWORK SWITCH

(75) Inventor: Akiyoshi Hashimoto, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 636 days.

(21) Appl. No.: 09/907,607

(22) Filed: Jul. 19, 2001

(65) Prior Publication Data
US 2002/0156887 A1 Oct. 24, 2002

(30) Foreign Application Priority Data
Apr. 18, 2001 (JP) ............... 2001-119056

(51) Int. Cl.
G06F 11/34 (2006.01)
G06F 9/50 (2006.01)

(52) U.S. Cl. ............ 709/224; 718/104; 718/105

(58) Field of Classification Search ........... 709/224, 709/238, 228; 718/105, 102, 104
See application file for complete search history.

(56) References Cited

U.S. PATENT DOCUMENTS

| | | | | |
|---|---|---|---|---|
| 5,937,428 A | * | 8/1999 | Jantz | 711/114 |
| 6,061,761 A | * | 5/2000 | Bachmat | 711/114 |
| 6,108,684 A | * | 8/2000 | DeKoning et al. | 718/105 |
| 6,442,650 B1 | * | 8/2002 | Bachmat et al. | 711/114 |
| 6,779,016 B1 | * | 8/2004 | Aziz et al. | 709/201 |
| 6,895,485 B1 | * | 5/2005 | DeKoning et al. | 711/170 |
| 2002/0129048 A1 | * | 9/2002 | Qiu et al. | 707/204 |
| 2003/0140193 A1 | * | 7/2003 | Acharya et al. | 711/112 |
| 2003/0237016 A1 | * | 12/2003 | Johnson et al. | 714/4 |
| 2004/0049564 A1 | * | 3/2004 | Ng et al. | 709/223 |
| 2004/0078465 A1 | * | 4/2004 | Coates et al. | 709/226 |
| 2004/0078466 A1 | * | 4/2004 | Coates et al. | 709/226 |
| 2004/0088297 A1 | * | 5/2004 | Coates et al. | 707/10 |

FOREIGN PATENT DOCUMENTS

| | | |
|---|---|---|
| JP | 63-223939 | 3/1987 |
| JP | 2-81154 | 9/1988 |
| JP | 7-244642 | 3/1994 |
| JP | 11-95934 | 9/1997 |
| JP | 11-296313 | 4/1998 |
| JP | 2000-242434 | 12/1999 |

* cited by examiner

Primary Examiner—Kenneth R. Coulter
(74) Attorney, Agent, or Firm—Reed Smith LLP; Stanley P. Fisher, Esq.; Juan Carlos A. Marquez, Esq.

(57) ABSTRACT

The present invention provides a storage network switch suitable for effective load balancing of a plurality of disk storage systems along with the mitigated burden of the host computer. The storage network switch for connecting a plurality of host computers to a plurality of disk storage systems has a load measuring means, and a data movement facility if required.

28 Claims, 13 Drawing Sheets

| DEVICE ID (301) | I/O PORT NUMBER (302) |
|---|---|
| 102 | 201 |
| 103 | 202 |
| 104 | 203 |
| 105 | 204 |
| 106 | 205 |
| ⋮ | ⋮ |

| I/O PORT NUMBER (501) | LOGICAL VOLUME ID (502) | NUMBER OF I/O COMMANDS (503) |
|---|---|---|
| 204 | 0 | 1234 |
| 205 | 4 | 5678 |
| 206 | 7 | 91011 |
| ⋮ | ⋮ | |

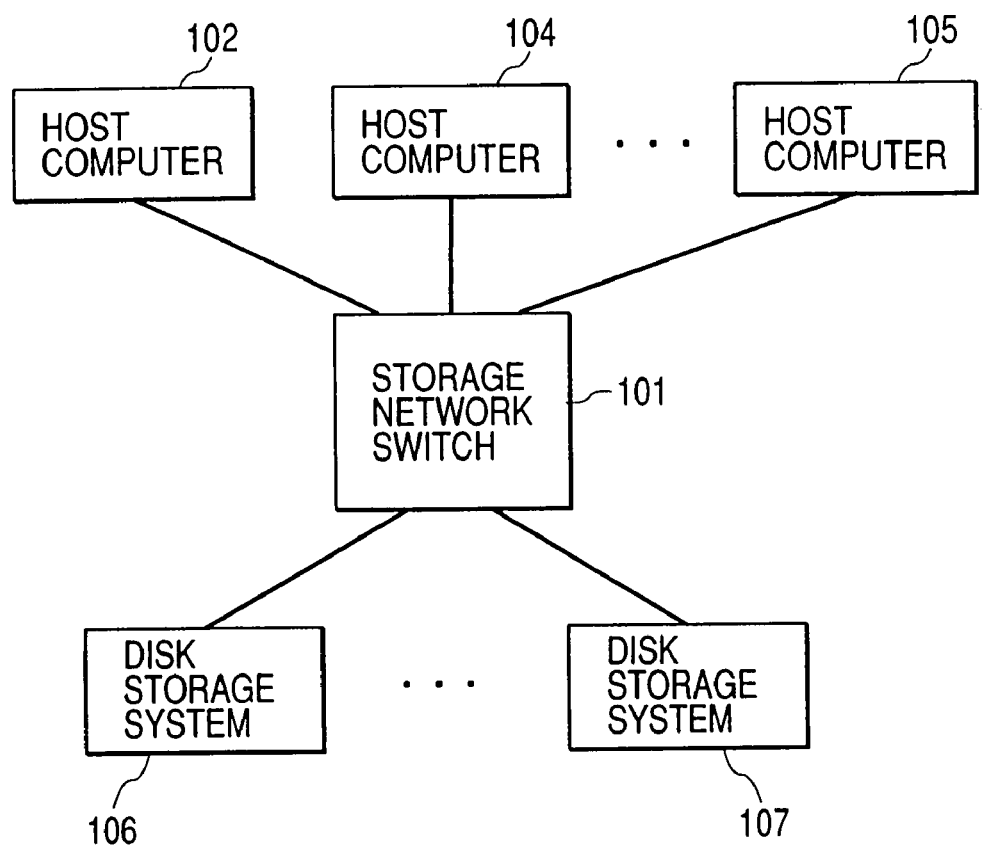
Prior Art  FIG. 14

STORAGE NETWORK SWITCH

BACKGROUND OF THE INVENTION

The present invention relates to a technology for balancing loads among a plurality of disk storage systems and more particularly to a storage network switch for networking a plurality of computers and a plurality of disk storage systems receiving the load balancing Most common design of computer systems to the date has been constituted of one host computer with a plurality of disk storage systems. To distribute load balancing among disk storages in such a system, the host computer is in general in charge of balancing. More specifically, in most cases, a program on the host monitors the load of disk storages, and in order to move data for load balancing, a user operates the computer, according to the monitored measurements to manually instruct the data movement.

For example, a typical process of data movement is disclosed in "SPARC & Solaris: performance tuning" by Adrian Cockcroft, Sun Microsystems Japan, Inc. Ed., pp 87 to pp 95, publishedby ASCII, Corp., 1995 (reference 1). In the reference 1, "iostat" program that runs on a host measures the load of the disk storage systems. The load can be determined by measuring the response time of I/O (input/output) commands issued by the program to the disk storage system.

Recently, a computer system has been emerged in which a plurality of host computers shares a plurality of disk storage systems. In such a system, a network switch connects a plurality of disk storage systems to a plurality of host computers. For example, Japanese Patent Laid-open (Kokai) No. Hei 07-244642 discloses a system in which a host computer selects disk storage systems in compliance with a predetermined set of rules so as to evenly balance the load among them.

Most recently, an interface scheme called fibre channel has been proposed to communicate between a plurality of host computers and a plurality of disk storage systems with advantages, and is being spread. The fibre channel is a standard allowing a high speed packet communication similar to any other typical network. At the time of writing a computer system is advent, which uses a fibre channel switch for a router, packet routing device. FIG. 14 shows an exemplary system architecture of such system, which includes a plurality of host computers 102, 104 and 105 connected to a plurality of disk storage systems 106 and 107 through a storage network switch 101 for routing packets.

SUMMARY OF THE INVENTION

In a system as shown in FIG. 14, the load measuring and load balancing of disk storage systems 106 and 107 at the host computers 102, 104 and 105 will be difficult. For example, when the host computers 102 and 104 are accessing a disk storage system 106 and if the "iostat" is run on the host computer 102, the program may obtain a response time to the disk storage system 106. If the response time is slower than normal, it cannot be determined whether the reason is the access from the host computer 104 or not. The longer the response time, the longer the load measuring, therefore the effective load balancing may become difficult.

To solve this situation, every host computers 102, 104 and 105 may have to exchange their respective I/O command issuing status to each of disk storage systems 106 and 107. The exchange of such data may be effective in some extent in condition that the number of host computers and disk storage systems are limited, however the exchange is practically not executable if a number of hosts involves.

When the exchange of status data among hosts is allowed, the amount of data processing of the load measuring and data movement will increase exponentially together with the increased number of host computers, resulting in that ultimately the amount of data processing may become significant for the resource pertaining to each host computer. In addition, the increased amount of data processing requires a befitting cost for exchanging load information and data movement.

The present invention has been made in view of the above circumstances and has an object to overcome the above problems and to provide a storage network switch, allowing the burden of host computers to be mitigated to perform load balancing among a plurality of disk storage systems more effectively than ever.

The problem to be solved by the present invention may be overcome by having a load measuring block in the storage network switch used for connecting a plurality of host computers with a plurality of disk storage systems. The storage network switch is a routing device which handles and relays communication between computers and storages, the amount of communication routed thereby namely, the traffic may be counted for example as the number of input and output (I/O) commands arriving from hosts so as to monitor and measure the load on the disk storage systems faster, to thereby enable the load balancing to be implemented effectively. The burden on host computers will be significantly decreased since hosts require not to exchange information on the status of accessing each of disk storage systems.

There may be cases in which the utilization of the processing power of host computers for commanding data movement is more effective, when a storage network switch executes the load balancing by replacement of data, namely, data movement based on the result of measured load. In such a case the load measuring block will need to inform host computers of the load information of monitored measurements in order to direct host computers to issue data movement commands.

There may also be cases in which, by pre-configuring a threshold for the varying load, an overloaded condition can be determined if the load exceeds the threshold and data movement can be effectively performed when the overload is detected. In such a case the storage network switch will require issuing data movement command by notifying the load information to the host computers. The hosts upon reception of the requirement will generate a data movement command based on thus received load information to send it to the storage network switch.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 4 is an example of routing table contained in the storage network switch shown in FIG. 3;

FIG. 5 is an example of load table contained in the storage network switch shown in FIG. 3;

FIG. 14 is a schematic block diagram illustratively indicative of a typical computer system including a storage network switch of the Prior Art.

DETAILED DESCRIPTION OF THE PREFERRED EMBODIMENTS

A detailed description of some preferred embodiments embodying the storage network switch in accordance with the present invention will now be given referring to the accompanying drawings.

Figure 1:
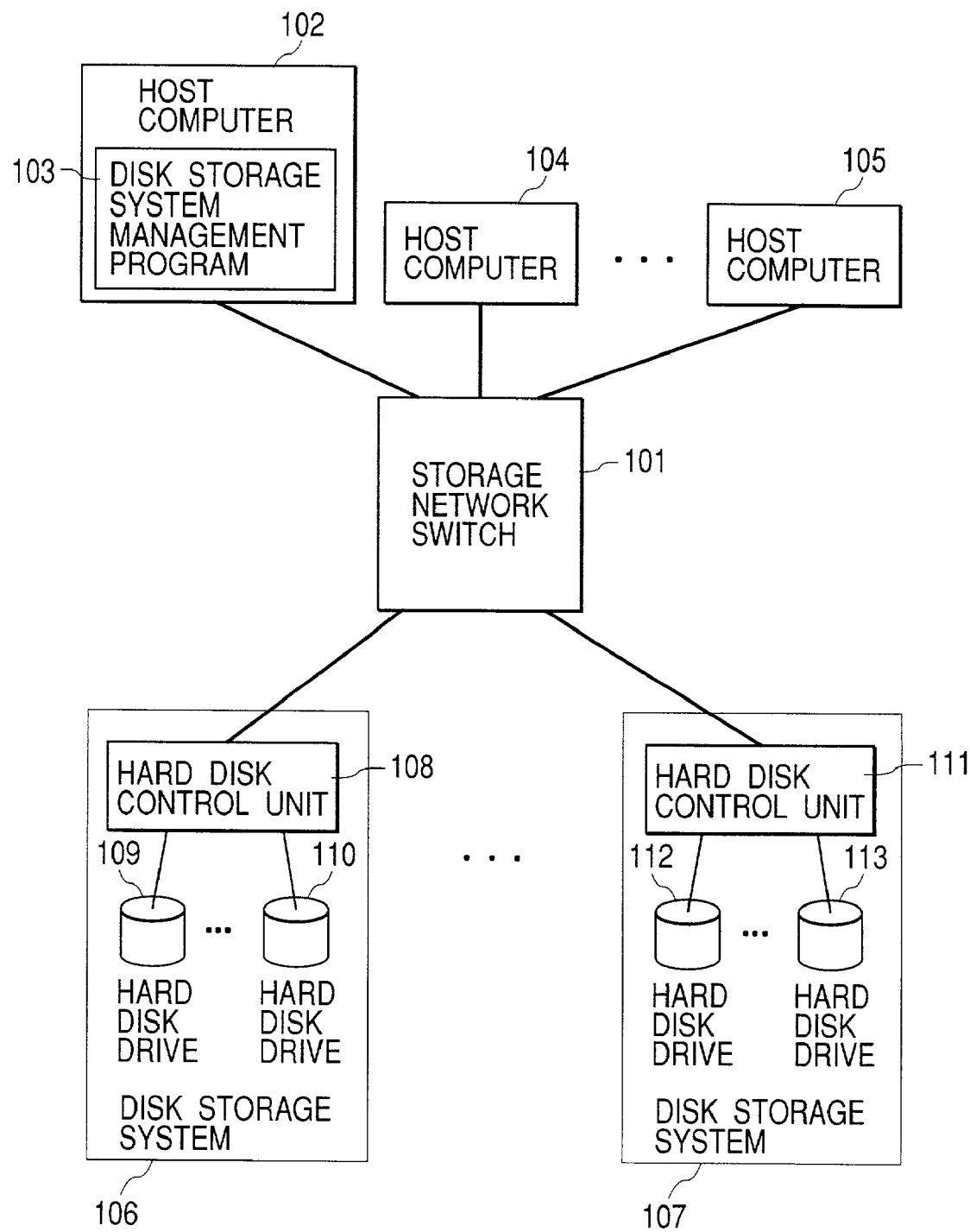
FIG. 1 is a schematic block diagram of an exemplary computer system including a storage network switch embodiment in accordance with the present invention.

A typical example of computer system with a storage network switch in accordance with the present invention is shown in FIG. 1. The computer system shown FIG. 1 comprises a storage network switch 101, host computers 102, 104, and 105, disk storage systems 106 and 107. The host computers 102, 104, and 105 and disk storage systems 106 and 107 are connected to storage network switch 101. The I/O commands and output data from the host computers 102, 104, and 105 will be transferred to the disk storage systems 106 and 107 via the storage network switch 101. The data sent from the disk storage systems 106 and 107 will be transferred to the host computers 102, 104, and 105 via the storage network switch 101.

The host computer 102 may have a disk storage system management program 103 for setting and managing the configuration of disk storage systems 106 and 107.

Figure 2:
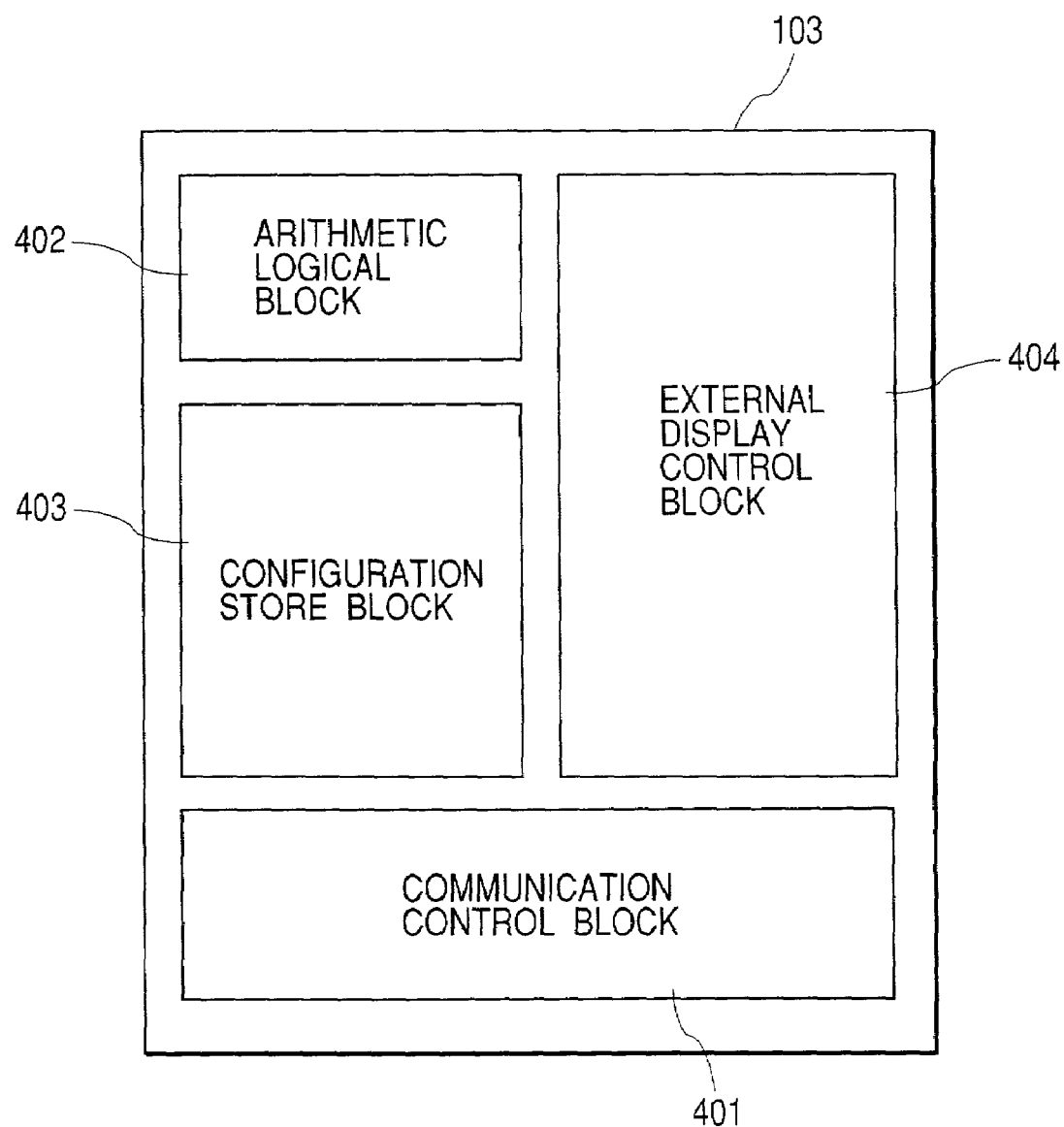
FIG. 2 is a schematic block diagram illustratively indicative of the functionality of a storage management program in accordance with the present invention.

The structure of the disk storage system management program 103 used to execute disk storage management task on the host computer 102 will be described with reference made to FIG. 2. The disk storage system management program 103 is constituted of, a communication control block 401 for communicating with the storage network switch 101 and host computers 104 and 105, an arithmetic logical block 402 for processing data on the disk storage systems 106 and 107 if required, a configuration store block 403 for storing logical connection of disk storage systems 106 and 107 to host computers 102, 104, and 105, and an external display control block 404 for displaying data on the disk storage on an output device such as a display unit (not shown) of a host computer.

The disk storage system 106 includes a hard disk control unit 108 and a hard disk drive units 109 and 110. The hard disk control unit 108 may communicate with the host computers 102, 104, and 105 to issue I/O commands to the hard disk drive units 109 and 110. The disk storage system 106 may have a disk array (RAID) device controlled by the hard disk control unit 108.

The disk storage system 107, as similar to the disk storage system 106, may have a hard disk control unit 111 and hard disk drive units 112 and 113, used for the same purpose as the disk storage system 106, in operation. The disk storage system 106 and disk storage system 107 need not to be made of the same type, same kind of disk in the present invention. The disk storage systems are only required to conform to the same communication protocol.

In this embodiment, although a protocol for frame-based data communication on a fibre channel is used, the present invention may be applied to any other protocols including TCP/IP and the like.

Figure 3:
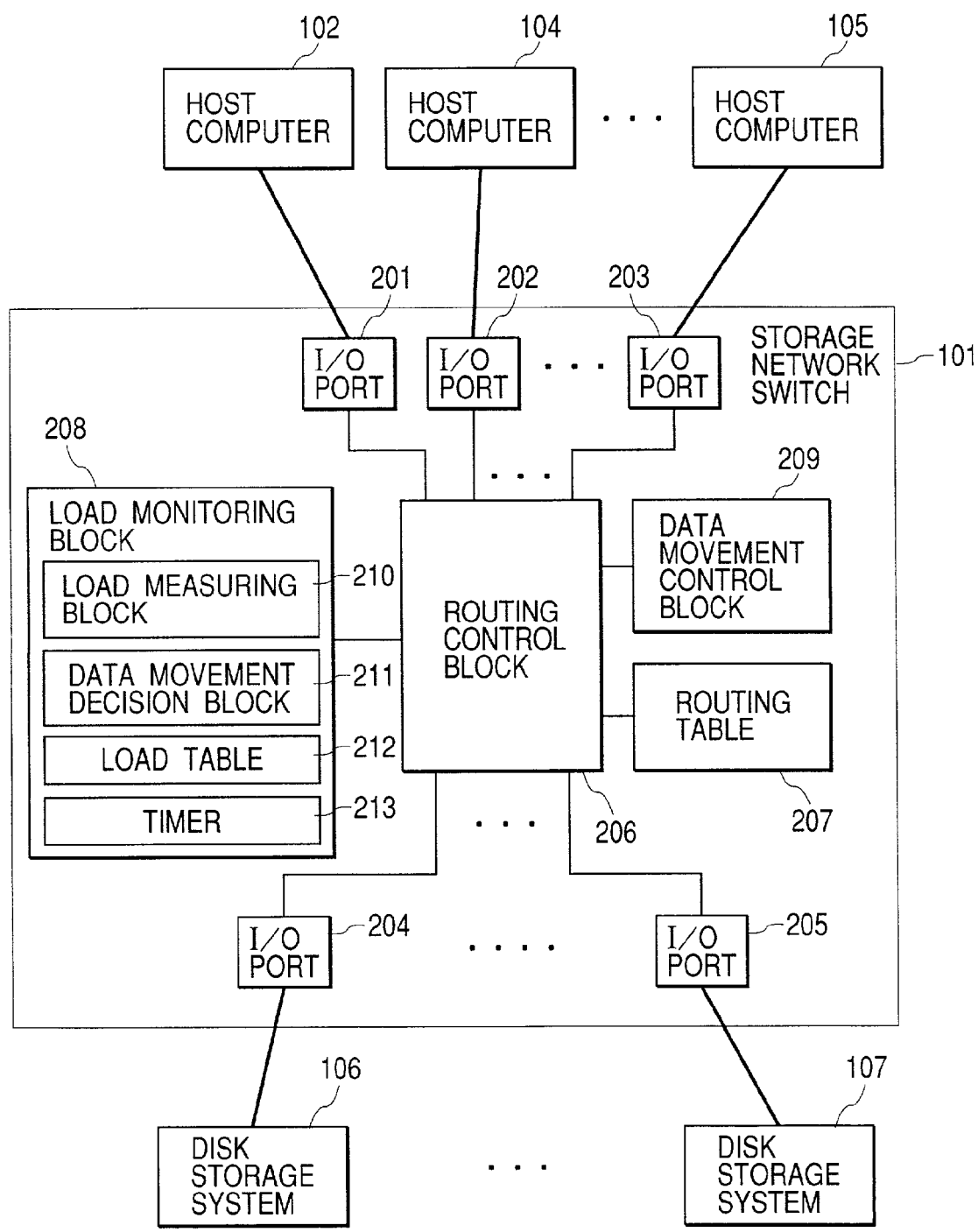
FIG. 3 is a schematic block diagram illustratively indicative of storage network switch embodiment in accordance with the present invention.

Now referring to FIG. 3, there is shown a schematic block diagram of the storage network switch 101 in greater details. The storage network switch 101 is constituted of, I/O ports 201 to 205 used for connecting to the host computers 102, 104, and 105 and to disk storage systems 106 and 107, a routing control block 206 for routing communication data from/to the host computers 102, 104, and 105 to/from disk storage systems 106 and 107, a routing table 207 for recording the routing information between the host computers 102, 104, and 105 and the disk storage systems 106 and 107 and for use in the communication data routing by the routing control block 206, a load monitoring block 208 for monitoring the load of the disk storage systems 106 and 107, and a data movement controller block 209 for commanding data movement among disk storage systems.

The load monitoring block 208 is primarily constituted of a load measuring block 210 for measuring the load on the disk storage systems 106 and 107, a data movement decision block 211 for determining whether the data movement among disk storage systems 106 and 107 is needed or not, a load table 212 for recording the load on the disk storage systems 106 and 107, and a timer 213 for clocking time.

The I/O commands and output data from the host computers 102, 104, and 105 will pass through the I/O ports 201 to 203 to the routing control block 206. Then the routing control block 206 will lookup the connection status stored in the routing table 207 to route the I/O commands and output data to the appropriate I/O port connected to the destination disk storage system.

Now referring to FIG. 4, there is shown an exemplary routing information stored in the routing table 207. The routing information is stored as a table, and comprised of a device identifier (ID) 301 and I/O port number 302. The device ID 301 is a number unique to any devices including the host computers 102, 104, and 105 as well as disk storage systems 106 and 107. The I/O port number 302 is a number designated to one of I/O ports 201 to 205. The routing table 207 stores, in one line, a device ID followed by an I/O port number to which the destination device is connected.

The fibre channel protocol used in the preferred embodiment defines the data transmission of frame basis. A frame will be sent with the source node device ID and destination node device ID labeled. The source ID and the destination ID will be abbreviated to as S_ID, D_ID.

The data routing process of the routing control block 206 by using the routing table 207 will be described. The routing control block 206, upon reception of a frame, will check to see the D_ID appended to the frame and then scan the device IDs 301 in the routing table 207. If a device ID 301 matched with the D_ID is found, then the routing control block 206 will read out the I/O port number 302 stored in the same line. The routing control block 201 will then be able to transfer data to the corresponding one of I/O ports 201 to 205.

The operation of the load measuring block 210 will be described in greater details with reference to FIG. 5 and FIG. 6. In the present embodiment, the load measuring block 210 may measure the issued number of I/O commands per a unit period of time with respect to the disk storage systems 106 and 107. However the present invention may also use any other suitable units, such as the amount of data to be transferred as the load. The issued number of I/O commands can be determined by checking to see the contents of frames routed on the routing control block 206 through I/O ports. Now the load table 212 to be generated in accordance with the load measuring by the load measuring block 210 will be described below.

Now referring to FIG. 5, there is shown a load table 212 stored in the load monitoring block 208. The load table 212 is a table, each line being constituted of an I/O port number 501, a logical volume ID 502, and the number of I/O commands 503. The logical volume is a virtual disk drive unit for the host computers 102, 104, and 105. Since the disk storage systems 106 and 107 may have a plurality of logical volumes therein, each volume needs to be identified by a unique number, the logical volume ID 502. The number of I/O commands 503 will be stored as the access frequency for a logical volume ID 502 in a disk storage system connected to the I/O port number 501 stated in the same line.

Figure 6:
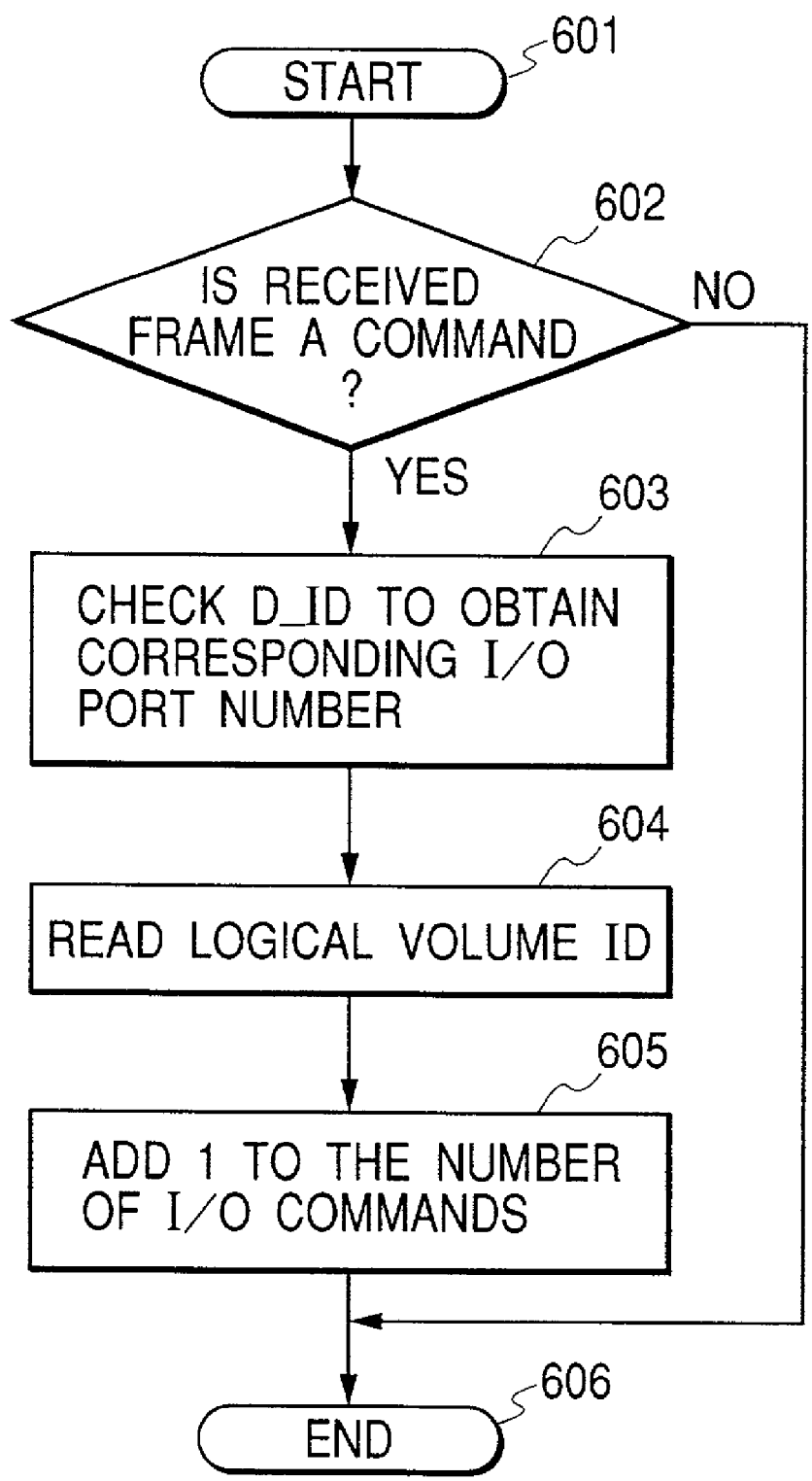
FIG. 6 is a flow chart illustratively indicative of process 3.

Now referring to FIG. 6, there is shown a flow chart illustrating the process steps performed in the load monitoring block 210. The process begins with step 601.

In step 602, the header of frames routed on the routing control block 206 will be checked. Each header may contain the frame attribute, which can indicate which the information contents stored in the frame can be an I/O command or data. When the frame contains data, nothing will be performed in this step to proceed to next step 605. If the frame is an I/O command then the process will proceed to step 603.

In step 603 the D_ID in the header will be checked. In this step the routing table 207 will be scanned to determine the I/O port number 303 that corresponds to the D_ID being checked. In step 604, when the header is an I/O command, the destination logical volume ID stated in the header will be read out therefrom. By measuring the load for each logical volume, it will be easier to determine which volume needs data movement.

In step 605, the logical volume ID connected to the I/O port number obtained in the previous step 603 will be looked up in the load table 212. Then the number of I/O commands stored in the same line will be incremented by one. If the appropriate frame contains an I/O command issued to the I/O port for the first time after initialization, then a new line will be added to write 1 in the field of number of I/O commands 503. Then the process will terminate at step 606.

The load measuring and check of frame header described above may have similar operation to the routing performed by the routing control block 206. Thereby the overhead of the monitoring and checking to the routing will be minimum.

Figure 7:
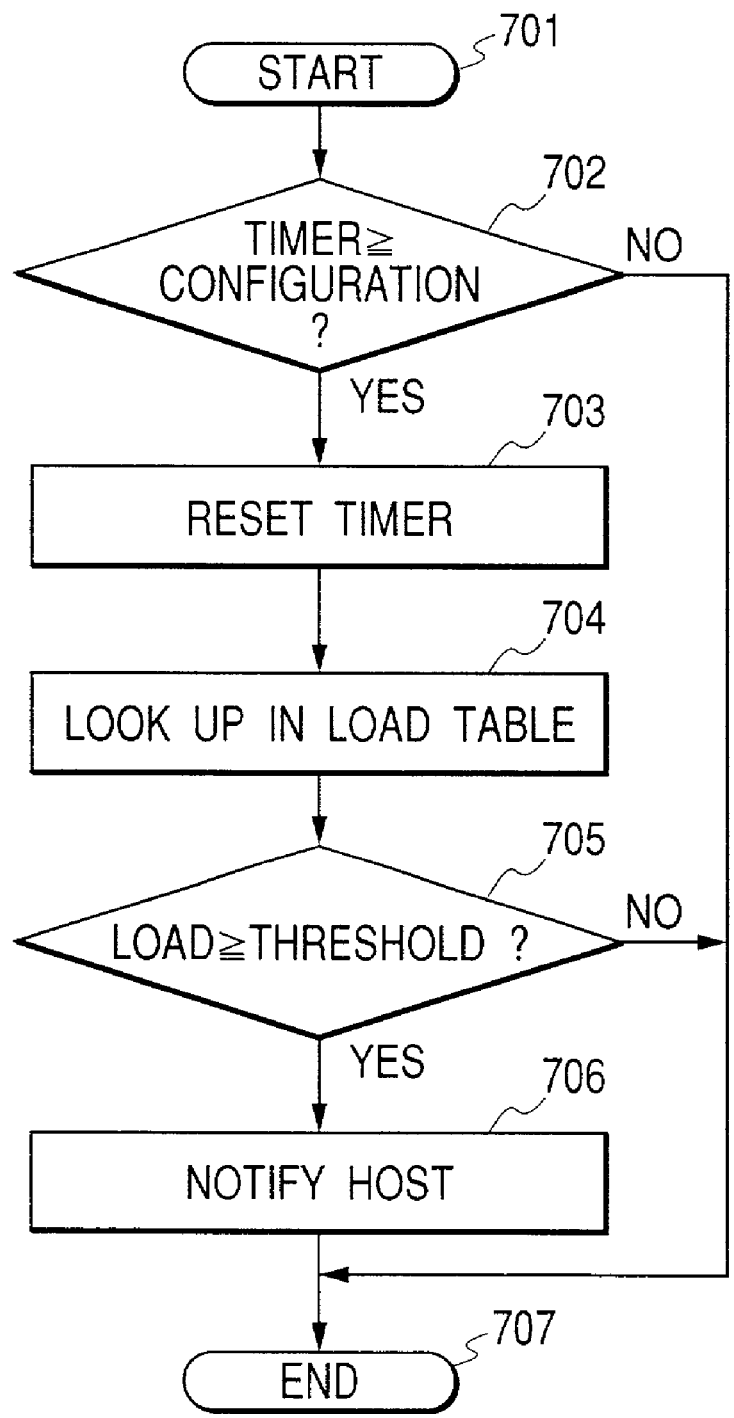
FIG. 7 is a flow chart illustratively indicative of process of data movement decsion by the storage network switch shown in FIG. 3.

Now referring to FIG. 7, the process flow of the data movement decision block 211 will be described which determines whether the data is to be moved or not. The decision will be made based on whether the load exceeds to a threshold, namely whether an overload condition is present. This process will be repeated for a predetermined period of time. The interval will be counted by the built-in timer 213. The built-in timer 213 will clock the time elapsed since the previous decision as its timer value.

The process begins with step 701. In step 702, the timer value will be checked to see whether it exceeds to a preset interval (the predetermined period of time described above). If the timer value is less than the preset interval, the program will proceed to step 707 without doing anything. If otherwise the timer value is larger than the preset value then the process will proceed to step 703, where data movement decision will be done. In step 703, the built-in timer 213 will be reset to 0. In the above process, the timer value may indicate the predetermined period of time, namely the elapsed time since the previous decision.

In step 704 the load table 212 will be looked up. In step 705 any ports having the number of I/O commands 503 exceeded beyond a predetermined threshold value or having an overload condition will be determined for the number of I/O commands 503 of every port. If there is not an I/O port which has the number exceeded, then the process will proceed to step 707.

Figure 8:
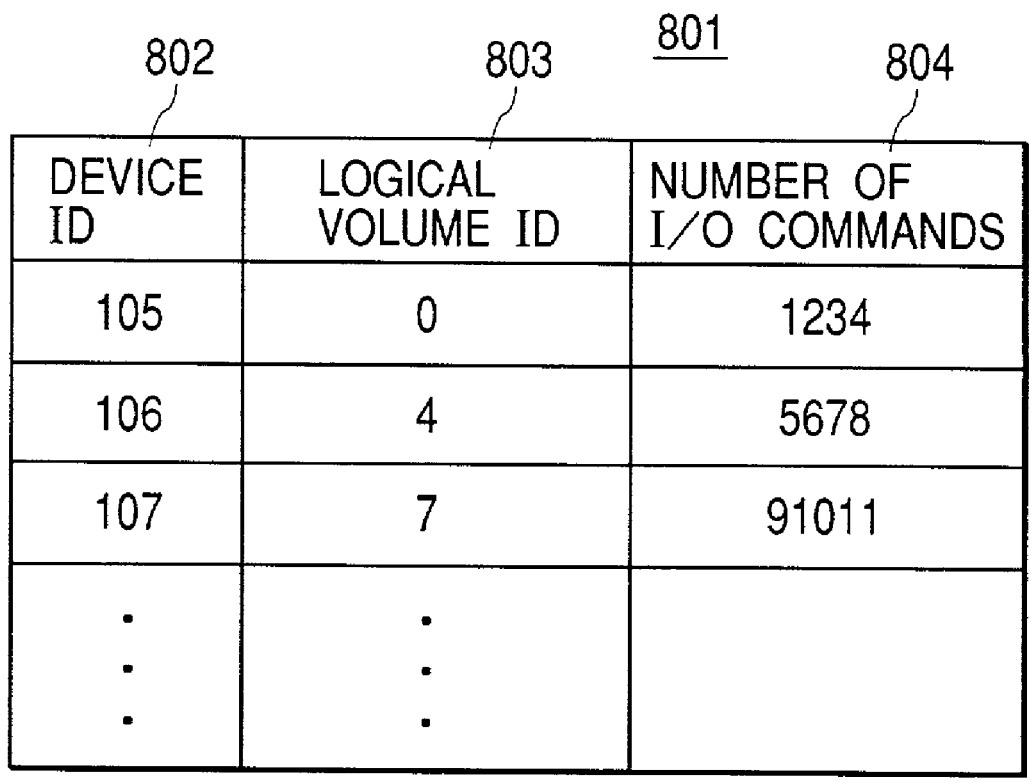
FIG. 8 is a table illustratively indicative of load information generated by the storage network switch shown in FIG. 3.

In step 706, if there is determined an I/O port having the number exceeded in step 705, then the host computer 102 will be notified of the port in question having the number exceeded to the threshold. The notice will be done by transmitting to the host the load information 801 in a table form as shown in FIG. 8. The device ID 802 is the device ID identical to that contained in the routing table 207. The logical volume ID 803 is the logical volume ID identical to the logical volume ID 502 contained in the load table 212. The number of I/O commands 804 is the number identical to the number of I/O commands 502 contained in the load table 212. The load information 801 thus contains the load condition of the disk storage systems for the host computer 102. The load information 801 informed to the host computer 102 will be fed to the disk storage system management program 103 running on the host computer 102. The process will terminate at step 707.

In accordance with the process as have been described above, the load condition of the disk storage systems 106 and 107 at a regular interval (or at a predetermined period of time) may be determined.

Figure 9:
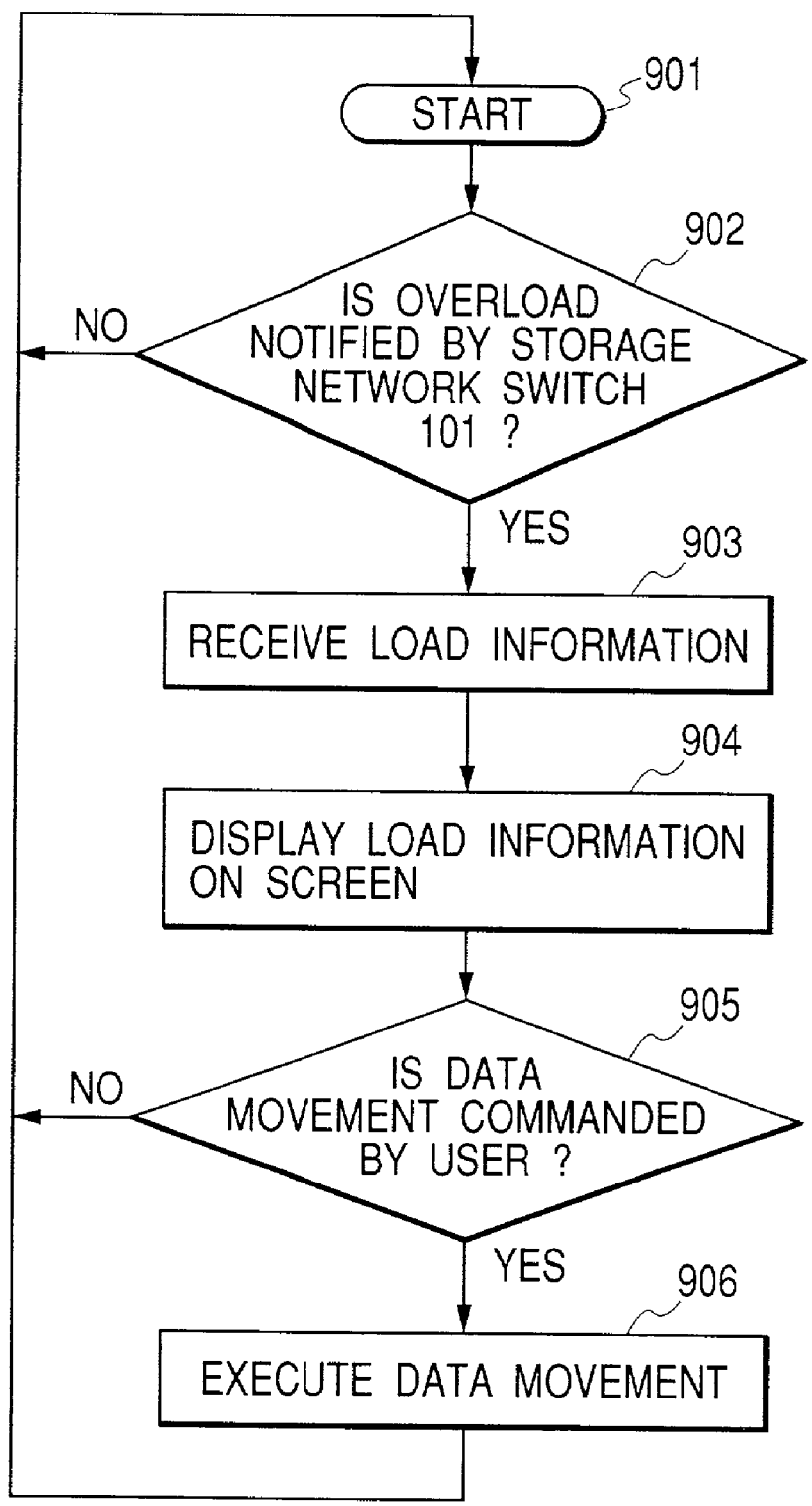
FIG. 9 is a flow chart illustratively indicative of the operating steps of disk storage system management program in accordance with the present invention when receiving load information from the storage network switch.

Next, referring to FIG. 9, the disk storage management process to be performed by the host computer 102 that has a notice sent from the storage network switch 101 will be described below in greater details. The process begins in step 901.

In step 902, the process will check to see whether there is a notice of overload sent from the storage network switch 101. If there is no notice then the process will go back to step 901.

In step 903, the process will receive the load information 801 sent from the storage network switch 101 to obtain the load condition of the disk storage systems 106 and 107.

In step 904, the load information obtained in step 903 will be displayed on the display of the host computer 102. The display indicative of the overloaded disk storage system may also be a dialog asking the user whether to perform the data movement.

In step 905, the user upon acknowledgment of the overload warning of the disk storage system in step 904 will decide whether to perform data movement or not. If the user instructs the disk storage system management program 103 to perform the data movement, the disk storage system management program 103 in turn will go to step 906; if otherwise the user does not instruct data movement, then the process will proceed back to step 901.

Figure 10:
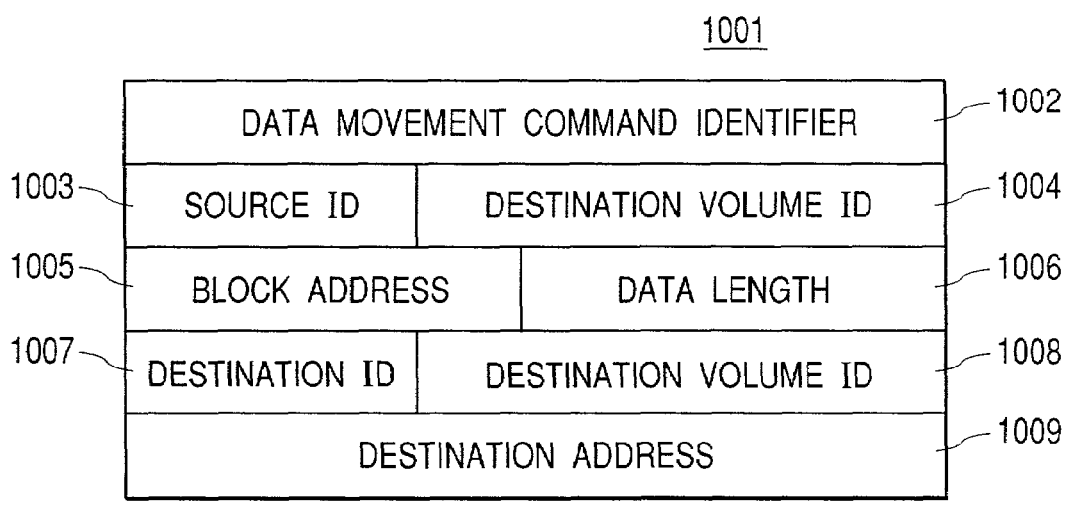
FIG. 10 is a schematic table illustratively indicative of a data movement command issued by a host computer.

In step 906, the program 103 will issue a data movement command upon reception of data movement instruction from the user in step 905. Actually, a data movement command will be issued from the host computer 102 to the storage network switch 101. The structure of command is shown in FIG. 10.

A data movement command 1001 includes a data movement command identifier 1002, a source ID 1003, a source volume ID 1004, a block address 1005, a data length 1006, a destination ID 1007, a destination volume ID 1008, and a destination address 1009.

The data movement command identifier 1002 is an identifier which indicates that the command is for the storage network switch 101. The source ID 1003 is a disk storage system ID of the data source. The source volume ID 1004 indicates the logical volume ID in the destination disk storage system. The I/O in the normal operation will be done by logical volume basis. In order to issue an I/O command therefore a logical volume needs to be specified. The block address 1005 is an address of the source logical volume for the data to be moved. The data length 1006 is the size of the data to be moved. The destination ID 1007 indicates the disk storage system ID of the destination of data. The destination volume ID 1008 indicates the logical volume ID of the destination disk storage system. The destination address 1009 indicates the destination address in the destination logical volume. When this command is received by the storage network switch 101, the data movement will be invoked.

As can be appreciated from the foregoing description, informing the host computer 102 of the load information 801 may be namely requiring data movement to the host computer 102. The host computer 102 having such a requirement will generate and send a data movement command to the storage network switch 101. The storage network switch 101 having received the transmission will invoke the data movement.

Figure 11:
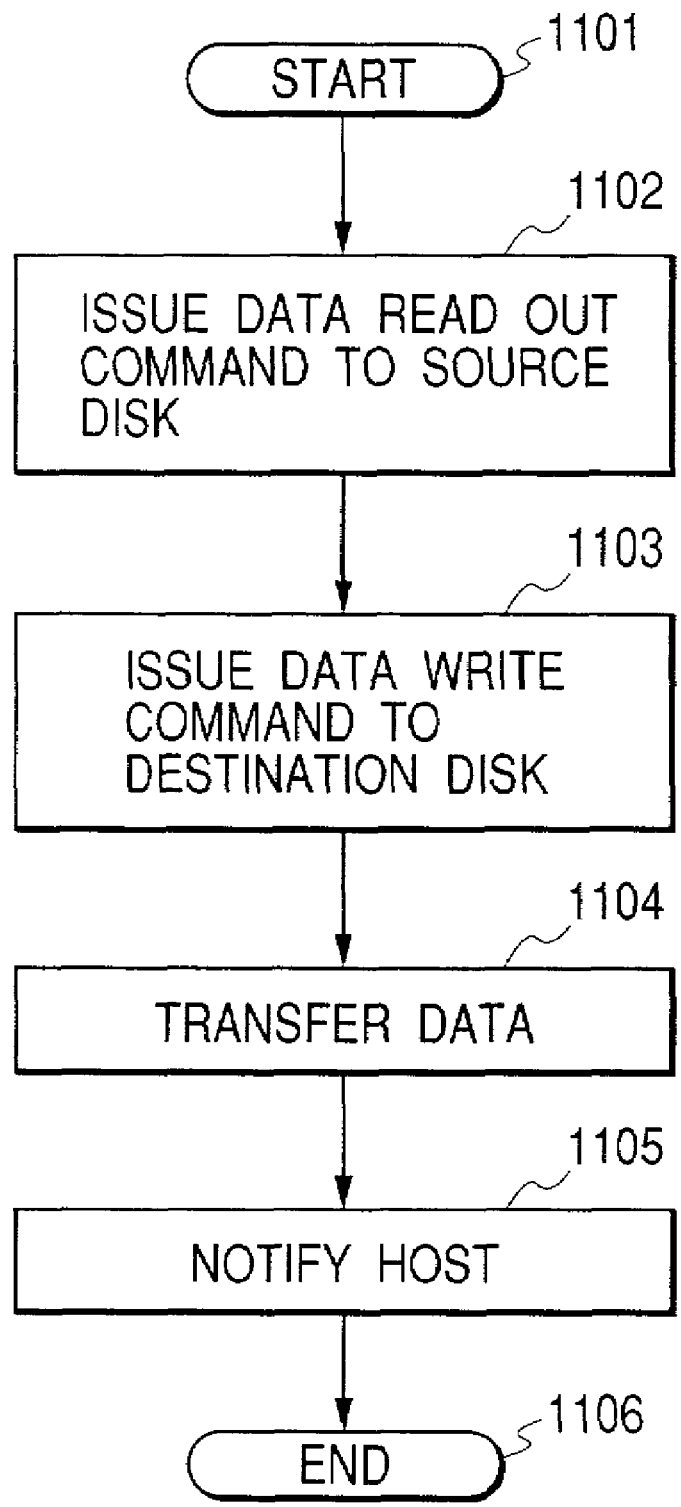
FIG. 11 is a flow chart illustratively indicative of process for executing data movement by the storage network switch shown in FIG. 3.

Next, referring to FIG. 11, the process of data movement to be performed by the data movement control block 209 in the storage network switch 101 will be described below. The process begins with step 1101.

In step 1102, a read out command will be issued to the source disk storage system. The command will be generated and issued by the storage network switch 101 by making use of information in the data movement command 1001 from the disk storage system management program 103.

In step 1103 a write command will be issued to the destination disk storage system. The command will be generated and issued by the storage network switch 101 by making use of the data movement command 1001 from the host computer.

In step 1104, according to the command issued by the storage network switch 101, data will be transferred from the source disk storage system to the destination disk storage system. Since this transfer does not need intervention by the host computer 102, the transfer rate will be higher when compared to the conventional transfer relying on the CPU of a host computer.

In step 1105, when the data transfer completed, the disk storage system management program 103 on the host computer 102 will be notified that the data transfer completed. The disk storage system management program 103 then will update the information with respect to the data movement. The process will terminate in step 1106.

The load monitoring and data transfer between disk storage systems will be completed according to the above process.

Alternatively, another scheme can be devised in which the storage network switch 101 may contain the disk storage system management program 103 and a small computer for executing the program so as to allow the storage network switch 101 itself to issue the data movement command and move data. Furthermore, the disk storage system management program 103 on the host computer 102 may always monitor the load information 801 generated by the storage network switch 101 so as to issue commands instructing the disk storage system to be used by the host computers 102, 104, and 105 from the disk storage system management program 103 to any appropriate host computers such that the load of the disk storage systems will be balanced. In an alternative way, each host computer may receive the load information 801 from the storage network switch 101 so as to select a disk storage system so that the load on the disk storage systems will be balanced. Any of above may be implemented by the storage network switch 101 monitoring the load.

Figure 12:
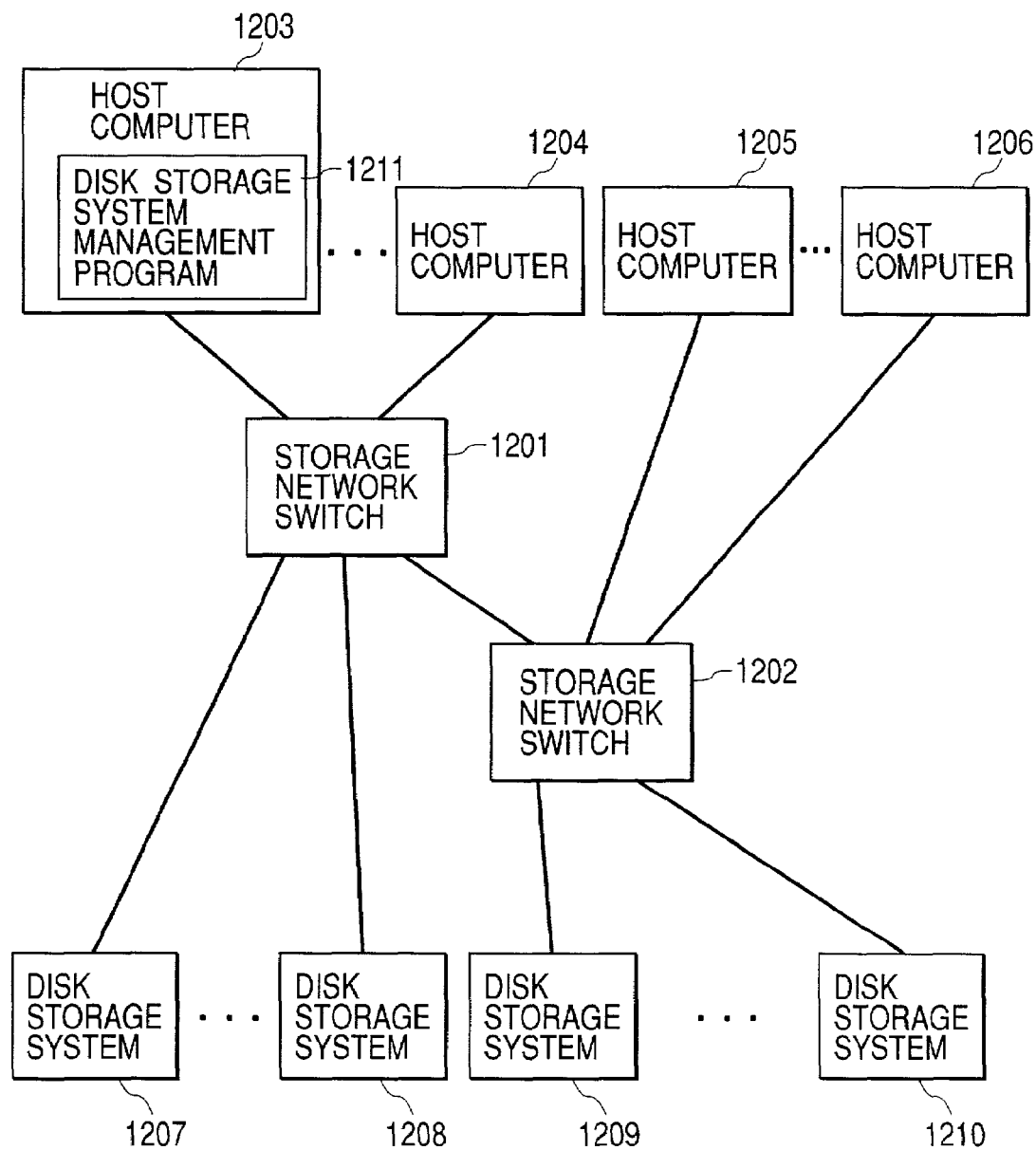
FIG. 12 is a schematic block diagram illustratively indicative of a typical computer system including another preferred embodiment of storage network switch in accordance with the present invention.
Figure 13:
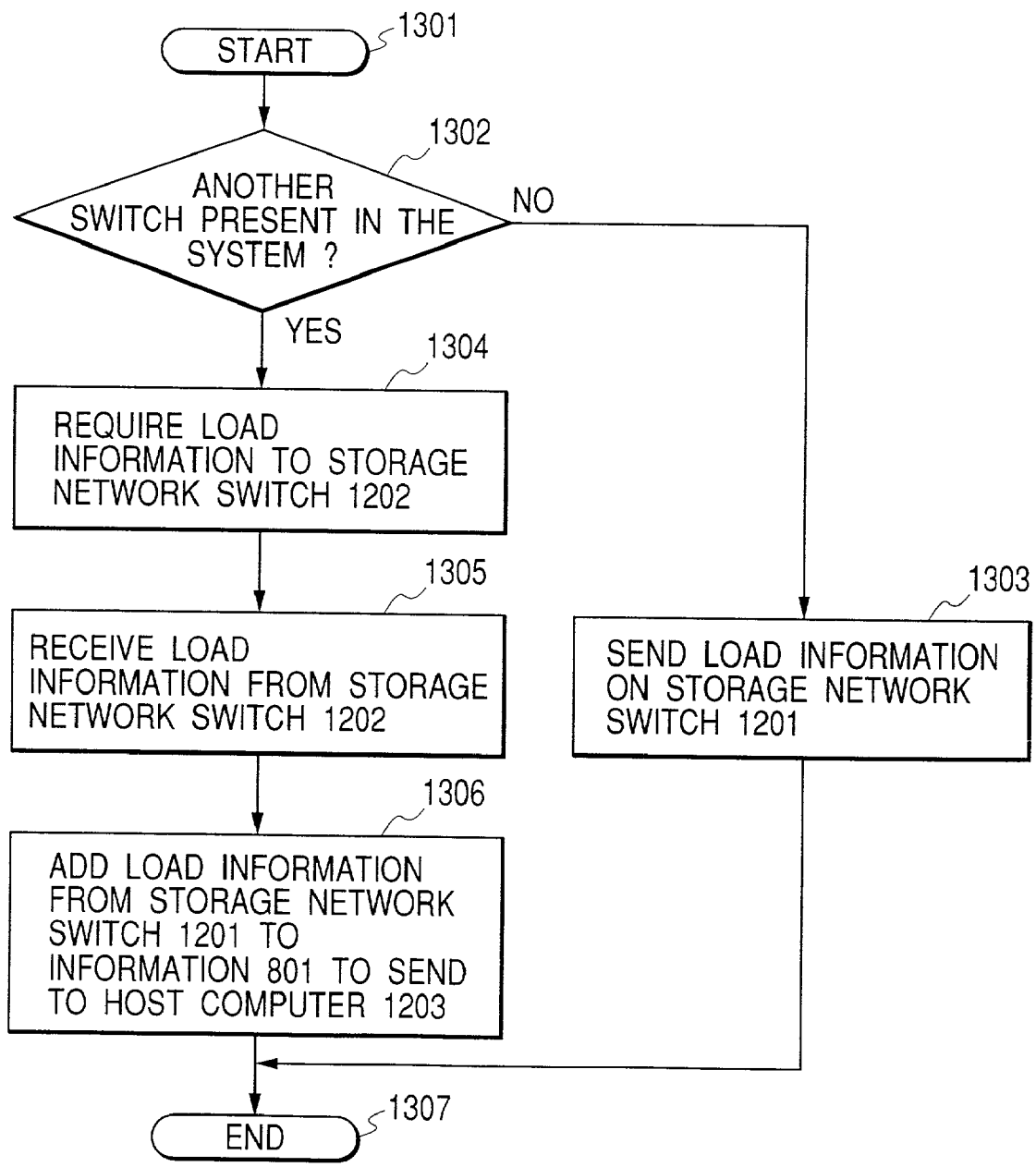
FIG. 13 is a flow chart illustratively indicative of process of data exchange in another preferred embodiment of storage network switch in accordance with the present invention.

Now referring to FIG. 12 and FIG. 13, another preferred embodiment of the present invention will be described. FIG. 12 shows a computer system with two storage network switches in accordance with the present invention. The storage network switch 1201 and storage network switch 1202 are hierarchically connected, with the host computers 1203 and 1204 connected to the storage network switch 1201 and host computers 1205 and 1206 connected to the storage network switch 1202. The disk storage systems 1207 and 1208 will be connected to the storage network switch 1201 and the disk storage systems 1209 and 1210 to the storage network switch 1202. The host computer 1203 may equip the disk storage system management program 1211 in accordance with the present invention.

In this construction, the storage network switch 1201 is at the same level as the host computers 1205 and 1206 with respect to the storage network switch 1202, as similar to the host computer 102 in the computer system shown in FIG. 1. It is necessary that the load information on the disk storage systems 1209 and 1210 is reported from the storage network switch 1202. That is, the storage network switches 1201 and 1202 need to mutually exchange information. The operation of information exchange will be described in greater details by referring to FIG. 13. The process may be performed by the storage network switch 1201 when a user operates the disk storage system management program 1211 on the host computer 1203 to require to the storage network switch 1201 the load information on the disk storage systems 1207 to 1210. The process will be performed by a communication control block (not shown) provided in the load monitoring block 208.

The process begins in step 1301. In step 1302, the process will check to see whether there is another storage network switch present in the computer system. This step may alternatively be implemented in other forms, such as by checking to see the system configuration information established at the time of system boot, or by confirming the presence of switches by communicating between storage network switches.

In step 1303, if there is not another storage network switch in the computer system, then the storage network switch will send its own load information 801 to the disk storage system management program 1211 and the process will terminate.

In step 1304, if there is another storage network switch found in the computer system, then the storage network switch will require the load information to the other storage network switch. In this embodiment, the switch will require the load information of the storage network switch 1202.

In step 1305, the storage network switch 1202, required to send its load information in step 1304, will send the load information that it maintains on the disk storage systems 1209 and 1210 to the storage network switch 1201. The storage network switch 1201 in turn will receive and store the load information sent from the switch 1202.

In step 1306, the storage network switch 1201 will transmit the load information received in step 1305 from the switch 1202 together with its own load information 801 held in it, to the host computer 1203 for performing the disk storage management in accordance with the disk storage system management program 1211. The user may confirm the result by watching the screen (not shown) displayed by the program steps of the disk storage system management program 1211 in the host computer 1203. The process will terminate in step 1307.

As can be appreciated from the foregoing description, the load monitoring and load balancing of disk storage systems may be achieved in a computer system having a plurality of storage network switches interconnected in accordance with the present invention.

In accordance with the present invention, a storage network switch may implement the load monitoring and load balancing of a plurality of disk storage systems. Therefore the load balancing and load monitoring in a computer system having a plurality of host computers and a plurality of disk storage systems interconnected via the storage network switch will be achieved in an effective way to mitigate the burden of host computer in order to balance the storage load.

It is further understood by those skilled in the art that the foregoing description is a preferred embodiment of the disclosed device and that various changes and modifications may be made in the invention without departing from the spirit and scope thereof.

What is claimed is:

1. A storage network switch for relaying communication between a plurality of host computers and a plurality of disk storage systems each of which includes a disk control unit for controlling at least one disk drive, comprising:
   a routing control unit controlling said communication between said plurality of disk storage systems and said plurality of host computers;
   a load measuring unit measuring for each logical volume of said plurality of disk storage systems a number of I/O requests from a host computer to a disk storage system when passing through said routing control unit; and
   a data movement control unit moving data from an overloaded storage system to another one of the storage systems upon receipt of a data movement command issued by a specific one of said plurality of host computers which is notified by said load measuring unit that an overload condition exists at said overloaded storage systems,
   wherein said storage network switch is physically connected between said plurality of host computers and said plurality of disk storage systems.

2. The storage network switch according to claim 1, wherein said load measuring unit notifies a load information resulted from the load measuring to said specific host computer in order for said specific host computer to issue the data movement command.

3. The storage network switch according to claim 1, further comprising: a data movement decision unit determining the overload condition of at least one of the disk storage systems requiring data movement on the basis of predetermined criteria, wherein when said data movement decision unit determines the overloaded condition, said load measuring unit notifies a load information resulted from the load measuring to said specific host computer in order for said specific host computer to issue the data movement command.

4. The storage network switch according to claim 2, wherein at the time of moving data, said data movement controller unit issues a read out command of data to be moved to a source one of said plurality of disk storage systems, issues a write command to a destination one of said plurality of disk storage systems when transfer of the data from said source disk storage system to said storage network switch is completed, and then transfers the data to the destination disk storage system.

5. The storage network switch according to claim 1, wherein an amount of the load to be measured by said load measuring unit is an issued number of input/output commands per a given unit time for each of said plurality of disk storage systems.

6. The storage network switch according to claim 1, wherein an amount of the load to be measured by said load measuring unit is an amount of data transfer per a given unit time for one of said plurality of disk storage systems.

7. The storage network switch according to claim 1, wherein said load measuring unit notifies a load information resulted from the load measuring to said plurality of host computers in order for said plurality of host computers to be able to select a disk storage system having less load.

8. The storage network switch according to claim 1, wherein the data movement control unit controls moving data among said each logical volume of said plurality of disk storage systems on the basis of load information obtained by said load measuring unit.

9. The storage network switch according to claim 8, wherein said load measuring unit checks a header included in a frame transmitted by said plurality of host computers and passing through said routing control unit to inspect whether the information stored in the frame is a command or not, and, when the information is the command, measures the loads for each logical volume of said plurality of disk storage systems by referring to each logical volume ID stated in the header.

10. The storage network switch according to claim 8, wherein said routing control unit routes the information inputted from each of the plurality of host computers to a destination disk storage system included in said plurality disk storage systems without changing the information.

11. The storage network switch according to claim 1, further comprising: an input/output unit receiving the information from said plurality of host computers on a frame basis according to a fiber channel protocol.

12. The storage network switch according to claim 1, wherein the information from said plurality of host computers include logical volume numbers of the plurality of disk storage systems for storing the information from said plurality of host computers, and
wherein said load measuring unit determines the logical volumes of the plurality of disk storage systems by reading out the logical volume numbers of the plurality of disk storage systems.

13. The storage network switch according to claim 1, wherein the information from said plurality of host computers include identifiers of said plurality of disk storage systems for storing the information from said plurality of host computers, and
wherein said load measuring unit determines input/output port numbers of the plurality of disk storage systems by checking the identifiers from the information from said plurality of host computers to determine logical volume numbers of said plurality of disk storage systems from the input/output port numbers.

14. The storage network switch according to claim 1, wherein said load measuring checks a header included in a frame transmitted by said plurality of host computers and passing through said routing control unit to inspect whether the information stored in the frame is a command or not, and, when the information is the command, measures the loads for each logical volume of said plurality of disk storage systems by referring to each logical volume ID stated in the header.

15. The storage network switch according to claim 1, wherein said routing control unit routes the information inputted from each of the plurality of host computers to a destination disk storage system included in said plurality disk storage systems without changing the information.

16. A storage network switch for relaying communication between a plurality of host computers and a plurality of disk storage systems each of which includes a disk control unit controlling at least one disk drive, comprising:
a routing control unit controlling said communication between said plurality of disk storage systems and said plurality of host computers;
a load measuring unit measuring for each logical volume of said plurality of disk storage systems a number of I/O requests from a host computer to a disk storage system when passing through said routing control unit; and
a data movement control unit moving data from an overloaded storage system to another one of the storage systems upon receipt of a data movement command issued by a specific one of said plurality of host computers which is notified by said load measuring unit that an overload condition exists at said overloaded storage systems,
wherein said storage network switch is physically connected between said plurality of host computers and said plurality of disk storage systems, and
said routing control unit also controls the communication by adding other storage network switches connected so that at least two storage network switches may be connected to each other,
further comprising a communication control unit communicating to and from said other storage network switches, wherein said communication control unit exchanges load information of said plurality of disk storage systems which are connected to said own storage network switch and other plurality of disk storage systems which are connected to said other storage network switches.

17. The storage network switch according to claim 16, wherein when other data movement is aborted in one of said other storage network switches due to a malfunction of other data movement control unit in said other storage network switch, said data movement control unit supersedes the troubled other data movement control unit to resume the other data movement suspended.

18. The storage network switch according to claim 16, further comprising: wherein said communication control unit notifies a load information obtained from the load measuring by said load measuring unit together with other load information of other storage network switches obtained by the data exchange with said other storage network switches to said specific host computer in order for said specific host computer to issue the data movement command.

19. The Storage network switch according to claim 16,
wherein said load measuring unit checks a header included in a frame transmitted by said plurality of host computers and passing through said routing control unit to inspect whether the information stored in the frame is a command or not, and, when the information is the command, measures the loads for each logical volume of said plurality of disk storage systems by referring to each logical volume ID stated in the header.

20. The storage network switch according to claim 16,
wherein said routing control unit routes the information inputted from each of the plurality of host computers to a destination disk storage system included in said plurality disk storage systems without changing the information.

21. A disk storage system management program stored on a tangible medium for making a specific host computer connected to a storage network switch comprising a routing control unit relaying communication between a plurality of host computers and a plurality of disk storage systems each of which includes a disk control unit controlling at least one disk drive; a load measuring unit measuring for each logical volume of said plurality of disk storage systems a number of I/O requests from a host computer to a disk storage system when passing through said routing control unit; and a data movement control unit moving data among said plurality of storage systems upon receipt of a data movement command issued by a specific one of said plurality of host computers, wherein said load measuring unit notifies a load information resulting from the load measuring to said specific host computer in order for said specific host computer to issue the data movement command, said storage network switch being physically connected between said plurality of host computers and said plurality of disk storage systems, so as to execute a method comprising the steps of:
reading out the load information notified from the load measuring unit in said storage network;
issuing a data movement command on the basis of an overload condition occurring in at least one of the disk storage systems included in the load information; and
moving data from an overloaded disk storage system to another one of the disk storage systems.

22. The disk storage system management program according to claim 21, further comprising the step of: displaying the load information for a user when said load information is notified.

23. The disk storage system management program according to claim 21,
  wherein said load measuring unit checks a header included in a frame transmitted by said plurality of host computers and passing through said routing control unit to inspect whether the information stored in the frame is a command or not, and, when the information is the command, measures the loads for each logical volume of said plurality of disk storage systems by referring to each logical volume ID stated in the header.

24. The disk storage system management program according to claim 21,
  wherein said routing control unit routes the information inputted from each of the plurality of host computers to a destination disk storage system included in said plurality disk storage systems without changing the information.

25. A disk storage system management program stored on a tangible medium for making a specific host computer connected to the storage network switch comprising a routing control unit relaying communication between a plurality of host computers and a plurality of disk storage systems each of which includes a disk control unit controlling at least one disk drive; a load measuring unit measuring for each logical volume of said plurality of disk storage systems a number of I/O requests from a host computer to a disk storage system when passing through said routing control unit; and a data movement control unit moving data among said plurality of disk storage systems upon receipt of a data movement command issued by a specific one of said plurality of host computers; and a data movement decision unit determining an overload condition of disk storage systems requiring data movement on the basis of predetermined criteria, wherein when said data movement decision unit determines the overloaded condition, said load measuring unit notifies a load information resulted from the load measuring to said specific host computer in order for said specific host computer to issue the data movement command, said storage network switch being physically connected between said plurality of host computers and said plurality of disk storage systems, so as to execute a method comprising the steps of:
  reading out a requirement of data movement notified from said load measuring unit which said storage network switch has;
  displaying the requirement of data movement for a user;
  issuing a data movement command on the basis of the overload condition occurring in at least one of the disk storage systems included in the requirement of data movement; and
  moving data from an overloaded disk storage system to another one of the disk storage systems.

26. The disk storage system management program according to claim 25,
  wherein said load measuring unit checks a header included in a frame transmitted by said plurality of host computers and passing through said routing control unit to inspect whether the information stored in the frame is a command or not, and, when the information is the command, measures the loads for each logical volume of said plurality of disk storage systems by referring to each logical volume ID stated in the header.

27. The disk storage system management program according to claim 25,
  wherein said routing control unit routes the information inputted from each of the plurality of host computers to a destination disk storage system included in said plurality disk storage systems without changing the information.

28. A network switch for relaying communication between a plurality of host computers and a plurality of disk storage systems each of which includes a disk control unit for controlling at least one disk drive, comprising:
  a routing control unit controlling said communication between said plurality of disk storage systems and said plurality of host computers;
  a first I/O port receiving an I/O request from a host computer to said routing control unit;
  a second I/O port receiving an I/O request from said routing control unit to a disk storage system; and
  a load measuring unit measuring for each logical volume of said plurality of disk storage systems a number of I/O requests from a host computer via said first I/O port to the routing control unit and then from the routing control unit to a disk storage system via said second I/O port,
  wherein said storage network switch is physically connected between said plurality of host computers and said plurality of disk storage systems.

* * * * *